(12) United States Patent
Chen et al.

(10) Patent No.: US 11,039,403 B2
(45) Date of Patent: Jun. 15, 2021

(54) TRANSMISSION POWER REGULATION OF ANTENNAS

(71) Applicant: HEWLETT-PACKARD DEVELOPMENT COMPANY, L.P., Spring, TX (US)

(72) Inventors: Cheng Chih Chen, Taipei (TW); Min Hsu Chuang, Taipei (TW); Chih Hung Chien, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/761,026

(22) PCT Filed: Feb. 14, 2018

(86) PCT No.: PCT/US2018/018100
§ 371 (c)(1),
(2) Date: May 1, 2020

(87) PCT Pub. No.: WO2019/160536
PCT Pub. Date: Aug. 22, 2019

(65) Prior Publication Data
US 2020/0374816 A1    Nov. 26, 2020

(51) Int. Cl.
*H04B 17/318* (2015.01)
*H04W 52/34* (2009.01)
(Continued)

(52) U.S. Cl.
CPC ........ *H04W 52/346* (2013.01); *H04B 17/318* (2015.01); *H04W 52/245* (2013.01); *H04W 88/06* (2013.01)

(58) Field of Classification Search
CPC . H04W 52/346; H04W 52/245; H04W 88/06; H04B 17/318
(Continued)

(56) References Cited

U.S. PATENT DOCUMENTS 5,579,373 A * 11/1996 Jang ...................... H04W 16/02
455/436
7,881,313 B2 * 2/2011 Scherzer ............... H04W 28/18
370/401
(Continued)

FOREIGN PATENT DOCUMENTS

WO    WO-2017155285 A1    9/2017

OTHER PUBLICATIONS

SAR Evaluation Considerations for LTE Devices, Dec. 16, 2015, Federal Communications Commission.

*Primary Examiner* — Hai V Nguyen
(74) *Attorney, Agent, or Firm* — HPI Patent Department

(57) ABSTRACT

In an example, an electronic device includes a first antenna and a second antenna. The electronic device may further include a power modulator to determine a simultaneous operation of the first antenna and the second antenna. The power modulator may monitor a first signal parameter of the first antenna and a second signal parameter of the second antenna. Upon monitoring signal parameters of respective antenna, the power modulator may dynamically regulate a first transmission power of the first antenna and a second transmission power of the second antenna based on the first signal parameter, the second signal parameter, and a threshold transmission value.

15 Claims, 5 Drawing Sheets

(51) Int. Cl.
*H04W 52/24* (2009.01)
*H04W 88/06* (2009.01)

(58) Field of Classification Search
USPC ............................................. 455/522, 69
See application file for complete search history.

(56) References Cited

U.S. PATENT DOCUMENTS

| | | | | |
|---|---|---|---|---|
| 8,175,539 | B2* | 5/2012 | Diener | H04L 1/0001 455/69 |
| 8,483,632 | B2* | 7/2013 | Asrani | H04W 52/245 455/117 |
| 8,520,579 | B2* | 8/2013 | Kazmi | H04W 52/243 370/311 |
| 8,655,400 | B2* | 2/2014 | Kadous | H04W 52/16 455/522 |
| 8,897,181 | B2* | 11/2014 | Wang | H04W 72/1215 370/282 |
| 8,934,852 | B2* | 1/2015 | Yan | H04B 7/0404 455/69 |
| 8,942,772 | B2* | 1/2015 | Yan | H04W 36/14 455/575.7 |
| 9,014,203 | B2* | 4/2015 | Scherzer | H04W 28/18 370/419 |
| 9,020,447 | B2* | 4/2015 | Bengtsson | H04B 7/0874 455/78 |
| 9,118,108 | B2* | 8/2015 | He | H04B 7/0602 |
| 9,231,302 | B2* | 1/2016 | He | H04B 7/0404 |
| 9,257,744 | B2* | 2/2016 | He | H04B 7/0802 |
| 9,503,216 | B2* | 11/2016 | Siomina | H04W 24/10 |
| 9,578,159 | B2* | 2/2017 | Muthukumar | H04W 12/06 |
| 9,749,878 | B2* | 8/2017 | Zhu | H04W 52/38 |
| 10,110,463 | B2* | 10/2018 | Reis | H04M 1/72418 |
| 10,420,023 | B2* | 9/2019 | Ramasamy | H04W 52/367 |
| 2003/0003905 | A1* | 1/2003 | Shvodian | H04L 1/1671 455/423 |
| 2004/0166886 | A1* | 8/2004 | Laroia | H04L 25/0226 455/522 |
| 2004/0166887 | A1* | 8/2004 | Laroia | H04W 52/325 455/522 |
| 2008/0259846 | A1* | 10/2008 | Gonikberg | H04W 72/1215 370/328 |
| 2010/0291963 | A1* | 11/2010 | Patel | H04W 52/367 455/522 |
| 2011/0117973 | A1* | 5/2011 | Asrani | H04W 52/245 455/571 |
| 2012/0106419 | A1* | 5/2012 | Gonikberg | H04W 8/005 370/311 |
| 2012/0147801 | A1* | 6/2012 | Ho | H04W 52/365 370/311 |
| 2012/0270519 | A1* | 10/2012 | Ngai | H04W 52/228 455/404.1 |
| 2013/0307727 | A1* | 11/2013 | He | H04W 88/06 342/374 |
| 2013/0308477 | A1* | 11/2013 | He | H04W 36/14 370/252 |
| 2013/0308478 | A1* | 11/2013 | He | H01Q 3/24 370/252 |
| 2013/0309982 | A1* | 11/2013 | Yan | H04W 72/085 455/79 |
| 2013/0310045 | A1* | 11/2013 | Yan | H04W 76/18 455/437 |
| 2014/0038675 | A1* | 2/2014 | Khlat | H04L 5/001 455/574 |
| 2014/0092795 | A1 | 4/2014 | Granger-Jones | |
| 2014/0106693 | A1* | 4/2014 | Khlat | H04W 52/0206 455/127.1 |
| 2014/0128032 | A1* | 5/2014 | Muthukumar | H04W 4/12 455/411 |
| 2014/0128115 | A1* | 5/2014 | Siomina | H04W 24/10 455/501 |
| 2014/0274195 | A1* | 9/2014 | Singh | H04W 52/40 455/522 |
| 2014/0370929 | A1* | 12/2014 | Khawand | H04W 52/367 455/522 |
| 2016/0098053 | A1* | 4/2016 | Khawand | H04W 52/367 307/116 |
| 2017/0006620 | A1* | 1/2017 | Reis | H04B 7/18517 |
| 2019/0215765 | A1* | 7/2019 | Ramasamy | H04W 52/367 |
| 2020/0015161 | A1* | 1/2020 | Ramasamy | H04W 52/243 |

\* cited by examiner

TRANSMISSION POWER REGULATION OF ANTENNAS

BACKGROUND

Electronic devices include an antenna to wirelessly communicate with other communication devices or a network. Some of these electronic devices also include multiple antennas to communicate with multiple different networks. For instance, an electronic device, such as a laptop, may include a Wireless Wide Area Network (WWAN) antenna to communicate with a wide area network (WAN) and a Wireless Local Area Network (WLAN) antenna to communicate with a local area network (LAN).

Generally, in an electronic device, one antenna is utilized at a time to communicate with a network. However, electronic devices may also simultaneously connect to multiple networks by utilizing multiple antennas concurrently.

BRIEF DESCRIPTION OF DRAWINGS

The detailed description is provided with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
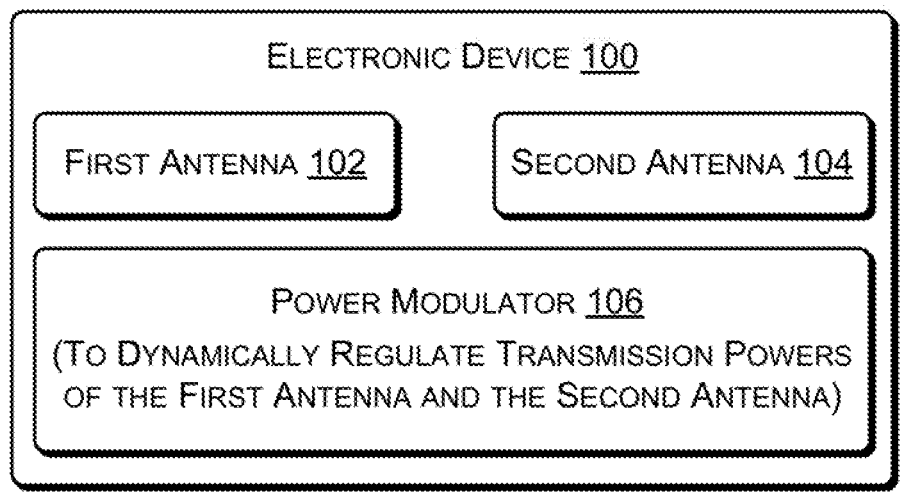
FIG. 1 illustrates an electronic device to dynamically regulate transmission power of antennas, according to an example.

Generally, electronic devices have multiple antennas to communicate and wirelessly connect to different networks. An antenna of an electronic device operates at defined frequency bands and generates a defined radio frequency output, also referred to as transmission power of the antenna. A maximum permissible transmission power for antennas of the electronic device is defined by regulatory authorities of different jurisdictions to avoid interferences among various frequency bands, and to avoid damages to humans' due to exposure to excessive radio frequency output power. Therefore, an antenna in an electronic device is designed such that the transmission power of the antenna does not exceed a maximum permissible specific absorption rate (SAR) value.

Electronic devices with multiple antennas may sometimes operate two or more antennas simultaneously, to connect to different networks during operation. Since the combined transmission power of the antennas also has to adhere to the maximum permissible SAR value, the transmission power of operating antennas is reduced by a fixed value to ensure that total transmitted power by the electronic device is not more than the maximum permissible SAR value.

Such fixed reduction in transmission power of an antenna generally results in underutilization of antennas. For instance, due to a fixed reduction in transmission power of antennas, one antenna may have to transmit at lower transmission power when it should transmit at higher transmission power due to low signal strength, while another antenna may be operating at a higher transmission power despite conditions of high signal strength. Accordingly, fixed reduction in transmission power of antennas to adhere to the SAR value, limits operational capability of the antennas.

According to examples of the present subject matter, techniques for dynamically regulating transmission power of multiple antennas in an electronic device are described. In an example, when multiple antennas of an electronic device are simultaneously operating, transmission power of an antenna is dynamically regulated based on signal parameters of an antenna. In an example, the regulation of the transmission power is such that a combined transmission power of all the antennas of the electronic device is below a threshold transmission value, where the threshold transmission value defines a maximum transmission power corresponding to the electronic device for adhering to the maximum permissible SAR value. Further, the signal parameters may indicate signal strength, signal power, or a combination thereof. In an example, the signal parameter of an antenna may include, but not limited to, Receiving Signal Strength Indicator (RSSI) and Receiving Signal Code Power (RSCP).

In another example, techniques are described for dynamically regulating transmission power of a first antenna and a second antenna of an electronic device. In operation, during a simultaneous operation of the first antenna and the second antenna, a first transmission power of the first antenna and a second transmission power of the second antenna are dynamically regulated based on a first signal parameter of the first antenna and a second signal parameter of the second antenna, along with the threshold transmission value. The first and second signal parameters are also indicative of a signal strength, a signal power, or a combination thereof, and the threshold maximum value.

In an example of the present subject matter, the electronic device may include a power modulator to dynamically regulate the first transmission power of the first antenna and the second transmission power of the second antenna. The power modulator may determine a simultaneous operation of the first and second antenna and, may monitor the first signal parameter and the second signal parameter of the first antenna and the second antenna, respectively. Thereafter, the power modulator may dynamically regulate the first transmission power of the first antenna and the second transmission power of the second antenna based on the monitored signal parameters and the threshold transmission value.

Thus, transmission power of an antenna is dynamically regulated based on its signal parameters, thereby preventing underutilization of the antennas due to fixed reduction in transmission power during a simultaneous operation of the antennas. Further, such dynamic regulation also prevents unnecessary reduction of data transmission range of the antennas.

The above techniques are further described with reference to FIG. 1 to FIG. 5. It should be noted that the description and the figures merely illustrate the principles of the present subject matter along with examples described herein and, should not be construed as a limitation to the present subject matter. It is thus understood that various arrangements may be devised that, although not explicitly described or shown herein, embody the principles of the present subject matter. Moreover, all statements herein reciting principles, aspects, and examples of the present subject matter, as well as specific examples thereof, are intended to encompass equivalents thereof.

FIG. 1 illustrates an electronic device 100 to dynamically regulate transmission power of antennas, according to an example. In the example, the electronic device 100 includes a first antenna 102, a second antenna 104, and a power modulator 106. The power modulator 106 may dynamically regulate a first transmission power of the first antenna 102 and a second transmission power of the second antenna 104.

In an example, the electronic device 100 may be a hand-held device, laptop, tablet, and the like. Further, the first antenna 102 may be a Wireless Wide Area Network (WWAN) antenna and the second antenna 104 may be a Wireless Local Area Network (WLAN) antenna.

In operation, the power modulator 106 determines a simultaneous operation of the first antenna 102 and the second antenna 104. The simultaneous operation is indicative of simultaneous transmission and reception of signals by the first antenna 102 and the second antenna 104. Thereafter, the power modulator 106 monitors a first signal parameter of the first antenna 102 and a second signal parameter of the second antenna 104. The first signal parameter and the second signal parameter are indicative of signal strength, signal power, or a combination thereof. In an example, the first signal parameter and second signal parameter include an RSSI, an RSCP, or a combination thereof.

Further, the first transmission power and the second transmission power are dynamically regulated based on the first signal parameter, the second signal parameter, and a threshold transmission value. In an example, the threshold transmission value is the maximum permissible SAR value. That is, the combined transmission power emitted by the electronic device 100, due to operation of the first antenna 102 and the second antenna 104, is within the maximum permissible SAR value.

In an example, the power modulator 106 may utilize a set of combinations of transmission powers to dynamically regulate the first transmission power and the second transmission power. It would be noted that the set of combinations of the transmission powers may include multiple combinations of transmission power, such that a combination of transmission power includes a first transmission power and a second transmission power.

In operation, based on the monitored signal parameters for the first antenna 102 and the second antenna 104, such as the RSSI and the RSCP, the power modulator 106 may select a combination of the first transmission power and the second transmission power, from the set of combination of transmission powers to determine the first transmission power and the second transmission power, corresponding to the signal parameters of the first antenna 102 and the second antenna 104. Thereafter, the power modulator 106 may dynamically regulate the first transmission power of the first antenna 102 and the second transmission power of the second antenna 104 based on the combination of the first transmission power and the second transmission power.

Figure 2:
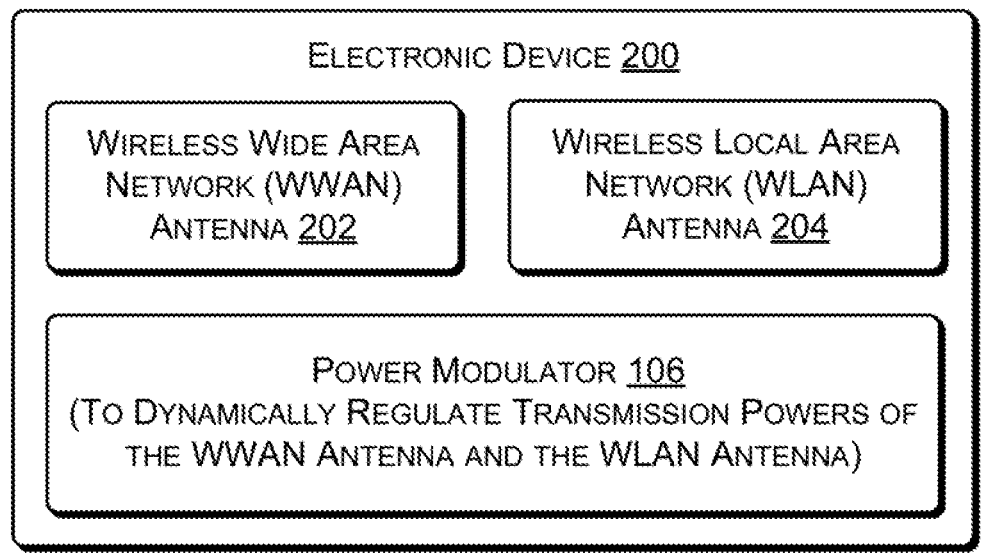
FIG. 2 illustrates an electronic device to dynamically regulate transmission power of a Wireless Wide Area Network (WWAN) antenna and a Wireless Local Area Network (WLAN) antenna, according to an example.

FIG. 2 illustrates another electronic device 200 to dynamically regulate transmission power of a WWAN antenna 202 and a WLAN antenna 204, according to an example. In the example, the electronic device 200 further includes the power modulator 106 to dynamically regulate a first transmission power of the WWAN antenna 202 and a second transmission power of the WAN antenna 204, based on signal parameters of the WWAN antenna 202 and the WLAN antenna 204.

In an example, the WWAN antenna 202 may be communicating with a WWAN base station (BS) and the WLAN antenna 204 may be communicating with a WAN access point (AP). Further, during a simultaneous operation of both the WWAN antenna 202 and the WLAN antenna 204, the WWAN antenna 202 and the WLAN antenna 204 simultaneously transmits and receives signals. That is, during the simultaneous operation, the WWAN antenna 202 simultaneously transmits and receives signals to and from the WWAN BS, and the WLAN antenna 204 simultaneously transmits and receives signals to and from the WLAN AP.

In operation, according to an example of the present subject matter, the power modulator 106 determines the simultaneous operation of the WWAN antenna 202 and the WLAN antenna 204 and, further, monitors a first signal parameter of the WWAN antenna 202 and a second signal parameter of the WLAN antenna 204. As described earlier, the first signal parameter and the second signal parameter may indicate the signal strength and/or signal power of the antennas of the electronic device 200.

Figure 3:
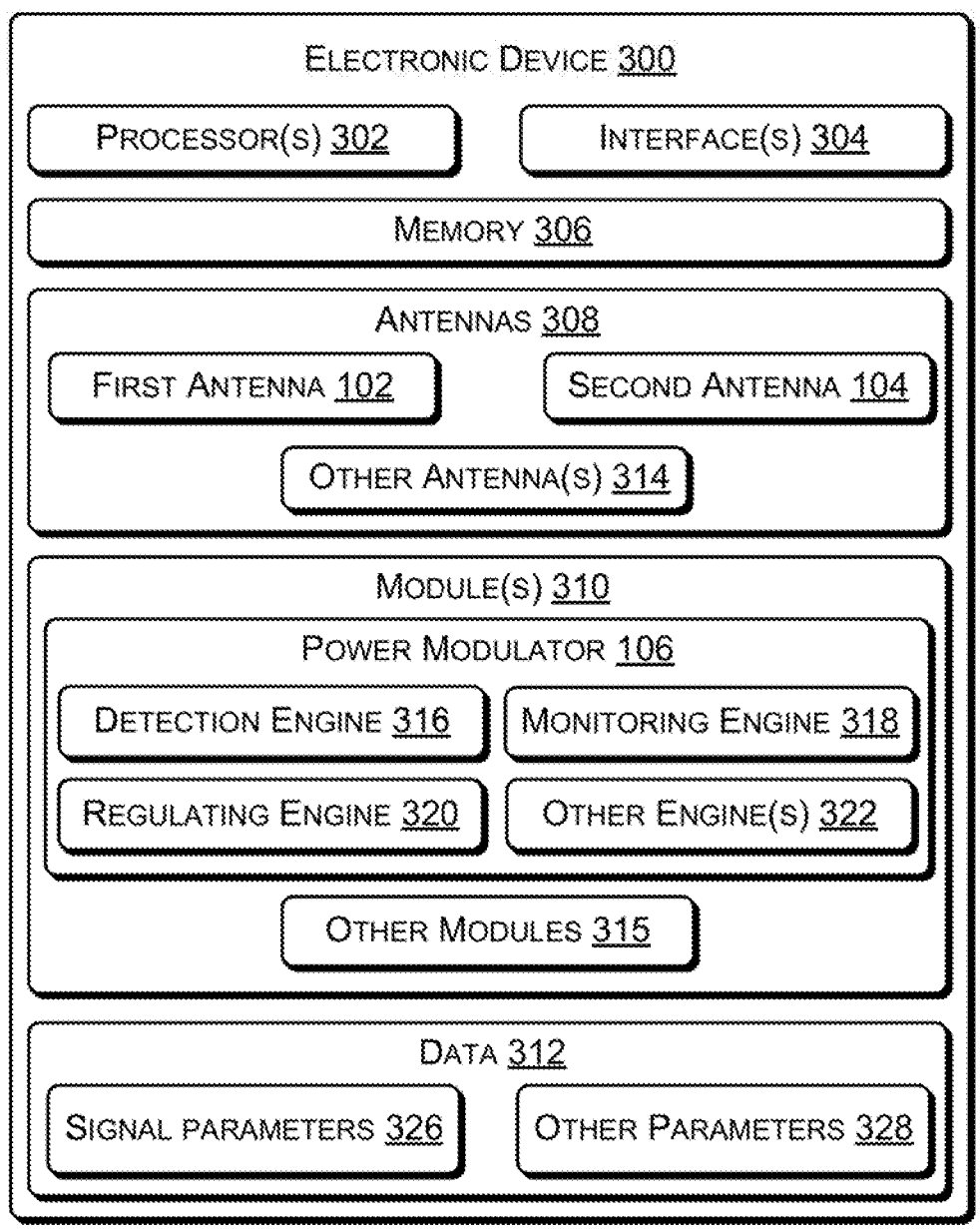
FIG. 3 illustrates an electronic device to dynamically regulate transmission power of antennas, according to an example.

The operation of the power modulator 106 has been further described in conjunction to the explanation of following FIG. 3, for the sake of brevity.

FIG. 3 illustrates an electronic device 300 to dynamically regulate transmission power of antennas, according to an example. The electronic device 300 may be implemented as a communication device which may be communicatively connected, through a network, to other communication devices. The electronic device 300 may be implemented as a laptop computer, a desktop computer, a notebook, a workstation, a mainframe computer, and the like. Further, the electronic device 300 may be implemented as a portable device, such as, a hand-held device, a tablet, a mobile phone, a PDA (Personal Digital Assistant), and a smartphone.

In an example of the present subject matter, the electronic device 300 may include processor(s) 302, interface(s) 304, and a memory 306. The processor(s) 302 may include microprocessors, microcomputers, microcontrollers, digital signal processors, central processing units, state machines, logic circuitries, and/or any other devices that manipulate signals and data based on computer-readable instructions. Further, the interface(s) 304 may include a variety of interfaces, for example, interfaces for data input and output devices, referred to as input/output (I/O) devices, storage devices, network devices, and the like. The interface(s) 304 facilitate communication between the electronic device 300 and various other communication devices connected in a networked environment. The memory 306 may store computer-readable instructions, which may be fetched and executed, to implement functionalities of the electronic device 300. The memory 306 may further include any non-transitory computer-readable medium including, for example, volatile memory such as RAM, or non-volatile memory such as EPROM (Erasable Programmable Read-Only Memory), flash memory, and the like.

In an example of the present subject matter, electronic device 300 may further include antenna(s) 308, module(s) 310, and data 312. The antenna(s) 308 may include a first antenna 102, a second antenna 104, and other antenna(s) 314. In an example, the first antenna 102 may be a WWAN antenna and the second antenna 104 may be a WLAN antenna. Further, the other antenna(s) 314 may include other antennas, such as a Bluetooth antenna, a Near Field Communication (NFC) antenna, and the like. In operation, an antenna may allow the electronic device 300 to connect to a communication network. For example, the first antenna 102 may communicate with a wireless access point (WAP) and the second antenna 104 may communicate with a Base Station (BS).

Further, the antennas 308 may operate in one of a stand-alone operation mode, or may operate in a simultaneous operation mode. In standalone operation mode, one antenna from among the antennas 308 may operate, while other antennas from amongst the antennas 308 may not operate. Whereas, during the simultaneous operation, all the antennas 308 perform simultaneously transmission and reception of signals.

The module(s) 310 may include the power modulator 106 and other module(s) 315. In an example of the present subject matter, the module(s) 310 may be implemented as a combination of hardware and computer readable instructions (for example, programmable instructions) to implement functionalities of the electronic device 300. In examples described herein, such combinations of hardware and computer readable instructions may be implemented in several ways. For example, the module(s) 310 may include processor executable instructions stored on a non-transitory machine-readable storage medium and the hardware for the module(s) 310 may include a processing resource (for example, processor(s)), to execute such instructions. In another example, the module(s) 310 may be implemented as firmware within the electronic device 300. In the present examples, the machine-readable storage medium may store instructions that, when executed by the processing resource, implement the functionalities of the module(s) 310. In such examples, the electronic device 300 may either include the machine-readable storage medium within the electronic device 300 or the machine-readable storage medium may be a separate entity but accessible to electronic device 300 and the processing resource(s) of the electronic device 300. In other examples, the module(s) 310 may be implemented by electronic circuitry.

Further, the data 312 may include data that is monitored by either predefined or generated by the module(s) 310. The data 312 may be stored in the memory 306, or any other persistent storage either within the electronic device 300 or coupled to the electronic device 300. Further, the data 312 may include signal parameters 326 corresponding to the antennas 308, and other parameters 328. For example, the signal parameters 326 may include value of RSSI, and RSCP parameters, corresponding to an antenna from amongst the antennas 308. Further, the other parameter(s) 328 may include additional details related to signals of the antennas 308.

In an example of the present subject matter, the power modulator 106 of the electronic device 300 may include a detection engine 316, a monitoring engine 318, a regulating engine 320, and other engine(s) 322. The other engine(s) 322 may implement functionalities that supplement applications or functions performed by the power modulator 106.

As described earlier, the electronic device 300 is to dynamically regulate the transmission power of the antenna(s) 308 by utilizing the power modulator 106. In one example, the power modulator 106 may be implemented as firmware within the electronic device 300, where the power modulator 106 may utilize the signal parameters 326 to dynamically regulate transmission power of the antennas 308.

In operation, the detection engine 316 of the power modulator 106 detects a simultaneous operation of the antennas 308. Further, the monitoring engine 318 monitors a signal parameter of an antenna. As described earlier, the signal parameters are indicative of signal strength, signal power, or a combination thereof. In an example, the signal parameters include an RSSI, an RSCP, or a combination thereof.

Upon determination of the signal parameters corresponding to an antenna, the regulating engine 320 may dynamically regulate the transmission power of an antenna based on the monitored signal parameters and a threshold transmission value, such that the combined transmission power of the electronic device 300 is less that the maximum permissible SAR value.

In an illustrative example, the electronic device 300 may include a WLAN antenna and a WWAN antenna. In such an example, the detection engine 316 of the power modulator 106 may determine a simultaneous operation of the WWAN antenna and the WLAN antenna. In such situation, the first transmission power of the WWAN antenna may be about 20 dBm and the second transmission power of the WLAN antenna may be about 25 dBm. Further, the threshold transmission value for the electronic device 300 may be defined as 40 dBm. In such a scenario, the power modulator 106 may dynamically regulate the first transmission power of the WWAN antenna and the second transmission power of the WLAN antenna, based on the signal parameters of the WWAN and the WLAN antennas, such that the total transmission power of the electronic device 300 is less than 40 dBm. To this end, the monitoring engine 318 of the power modulator 106 may determine a first signal parameter for the WWAN antenna and a second signal parameter for the WLAN antenna.

Further, the regulating engine 320 may dynamically regulate the first transmission power of the WWAN antenna and the second transmission power of the WAN antenna based on the signal parameters determined by the monitoring engine 318. In an instance, the monitoring engine 318 may determine that the first signal parameter has higher value than the second signal parameter, i.e., signal strength or signal power of the WWAN antenna is higher than that of the WLAN antenna. In such a situation, the regulating engine 320 may reduce the first transmission power of the WWAN antenna to about 16 dBm from 20 dBm and may reduce the second transmission power of the WLAN antenna to about 24 dBm from 25 dBm, based on the signal parameters, to keep the combined transmission power of the electronic device 300, below 40 dBm.

In another scenario, the monitoring engine 318 may determine that the first signal parameter of the WWAN antenna has a lower value than the second signal parameter of the WLAN antenna, i.e., signal strength or signal power of the WWAN antenna is lower than that of the WLAN antenna. In such situation, the regulating engine 320 may reduce the first transmission power of the WWAN antenna to about 19 dBm from 20 dBm and may reduce the second transmission power of the WLAN antenna to about 21 dBm from 25 dBm, based on the signal parameters, to keep the combined transmission power of the electronic device 300, below 40 dBm.

In yet another scenario, the monitoring engine 318 may determine that the first signal parameter of the WWAN antenna and the second signal parameter of the WLAN antenna have comparable values, i.e., signal strength or signal power of the WWAN antenna is similar to that of the WAN antenna. In such situation, the regulating engine 320 may reduce the first transmission power of the WWAN antenna to about 17 dBm from 20 dBm and may reduce the second transmission power of the WLAN antenna to about 23 dBm from 25 dBm based on the signal parameters, to keep the combined transmission power of the electronic device 300, below 40 dBm. Thus, the first transmission power of the WWAN antenna and the second transmission power of the WLAN antenna are dynamically regulated based on the first signal parameter, the second signal parameter, the threshold transmission value.

In an example, the power modulator 106 may utilize a set of combinations of transmission powers to dynamically regulate the first transmission power and the second transmission power. In the example, the set of combination of transmission powers may be stored in the form of matrices, where a matrix includes a combination of the first transmission power and the second transmission power. Furthermore, in another of the present subject matter, the set of combination of transmission powers may be stored in the form of an array, where an array entry includes a combination of the first transmission power and the second transmission power. It should be noted that any other technique, such as a tabular form of data storage may be used for storing combinations of the first transmission power and the second transmission power.

In an example of the present subject matter, the regulating module 320 may utilize a function for generating the set of combination of transmission powers for the WWAN antenna and the WLAN antenna, based on the first signal parameter and the second signal parameter. For instance, the function may generate multiple combinations of the first transmission power of the WWAN antenna and the second transmission power of the WLAN antenna based on the first signal parameter, the second signal parameter, and the threshold transmission value.

Figure 4:
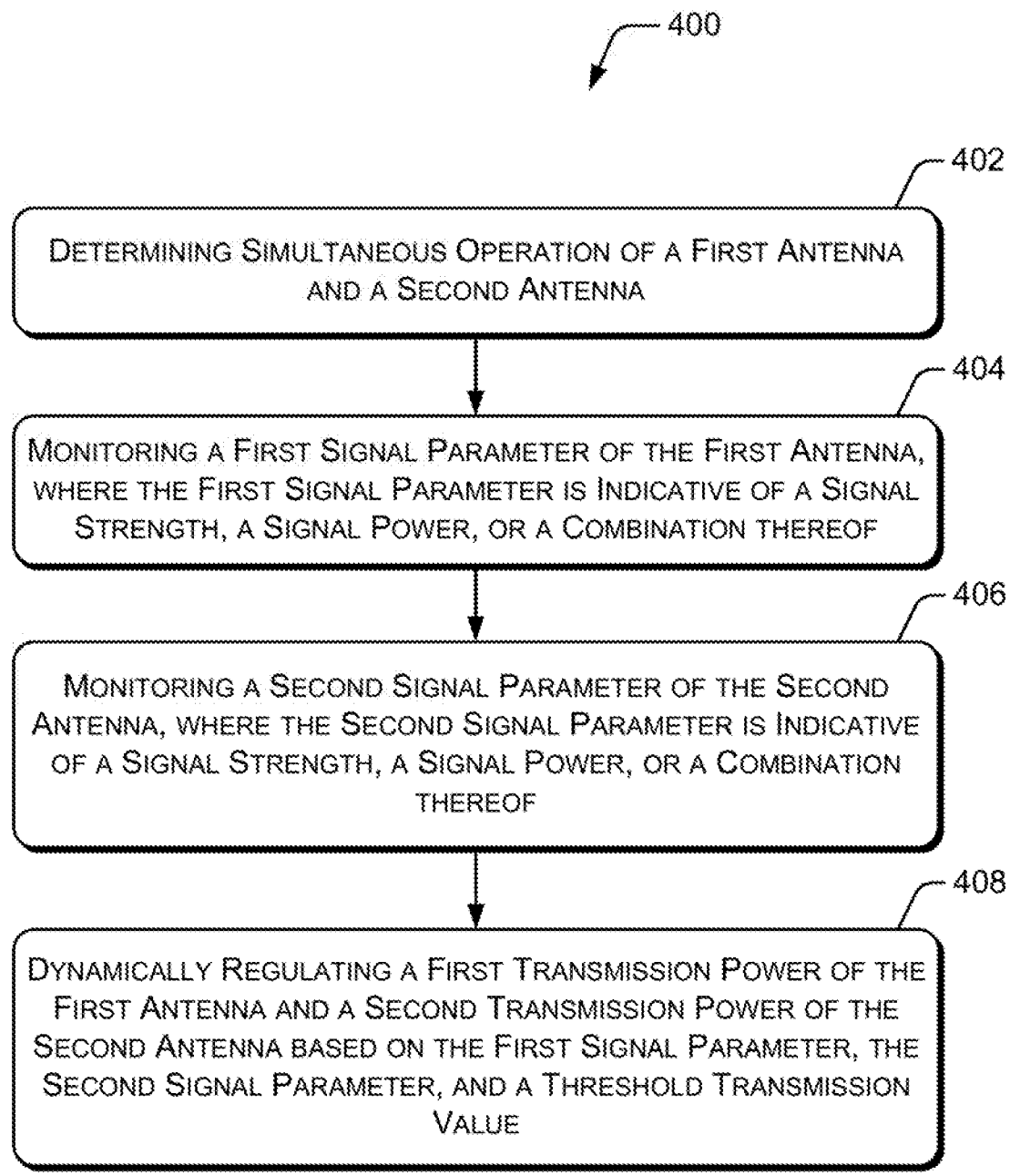
FIG. 4 illustrates a method of operation at an electronic device to dynamically regulate transmission power of a first antenna and a second antenna, according to an example.

FIG. 4 illustrates a method 400 of operation of an electronic device to dynamically regulate the transmission powers of antenna of antennas, according to an example. The order in which the method 400 is described is not intended to be construed as a limitation, and any number of the described method blocks may be combined in any order to implement the method 400, or any alternative methods. Furthermore, the method 400 may be implemented by electronic devices, electronic circuits, or processor(s) through any suitable hardware, or combination thereof.

At block 402, simultaneous operation of a first antenna 102 and a second antenna 104 of an electronic device is determined. For example, in an electronic device, such as the electronic device 300, simultaneous operation of the first antenna 102 and the second antenna 104 is determined by the detection engine 316.

At block 404, a first signal parameter of the first antenna 102 is monitored. For example, the monitoring engine 318 of the electronic device 300 may monitor the first signal parameter of the first antenna 102.

At block 406, a second signal parameter of the second antenna 104 is monitored. In an example, the second signal parameter of the second antenna 104 may be monitored by the monitoring engine 318. Further, the first signal parameter and the second signal parameter may indicate a signal strength and/or a signal power of the first antenna 102 and the second antenna 104.

At block 408, a first transmission power of the first antenna 102 and a second transmission power of the second antenna 104 are dynamically regulated based on the first signal parameter, the second signal parameter, and a threshold transmission value. In an example, the first transmission power and the second transmission power may be dynamically regulated by the regulating engine 320.

In an example, regulated first transmission power of the first antenna 102 and regulated second transmission power of the second antenna 104 may be further dynamically regulated based on the first signal parameter, the second signal parameter, and the threshold transmission value. For instance, the regulated first transmission power of the first antenna 102 may be about 17 dBm and the regulated second transmission power of the second antenna 104 may be about 23 dBm. Further, the threshold transmission value for the electronic device 300 may be about 40 dBm.

In such a scenario, while regulating the regulated first transmission power and the regulated second transmission power, the regulated first transmission power of the first antenna 102 may be increased to 19 dBm from 17 dBm and the regulated second transmission power of the second antenna 104 may be reduced to 21 dBm from 23 dBm, based on the signal parameters of the first antenna 102 and the second antenna 104, such that the total transmission power of the electronic device 300 is less than 40 dBm.

Figure 5:
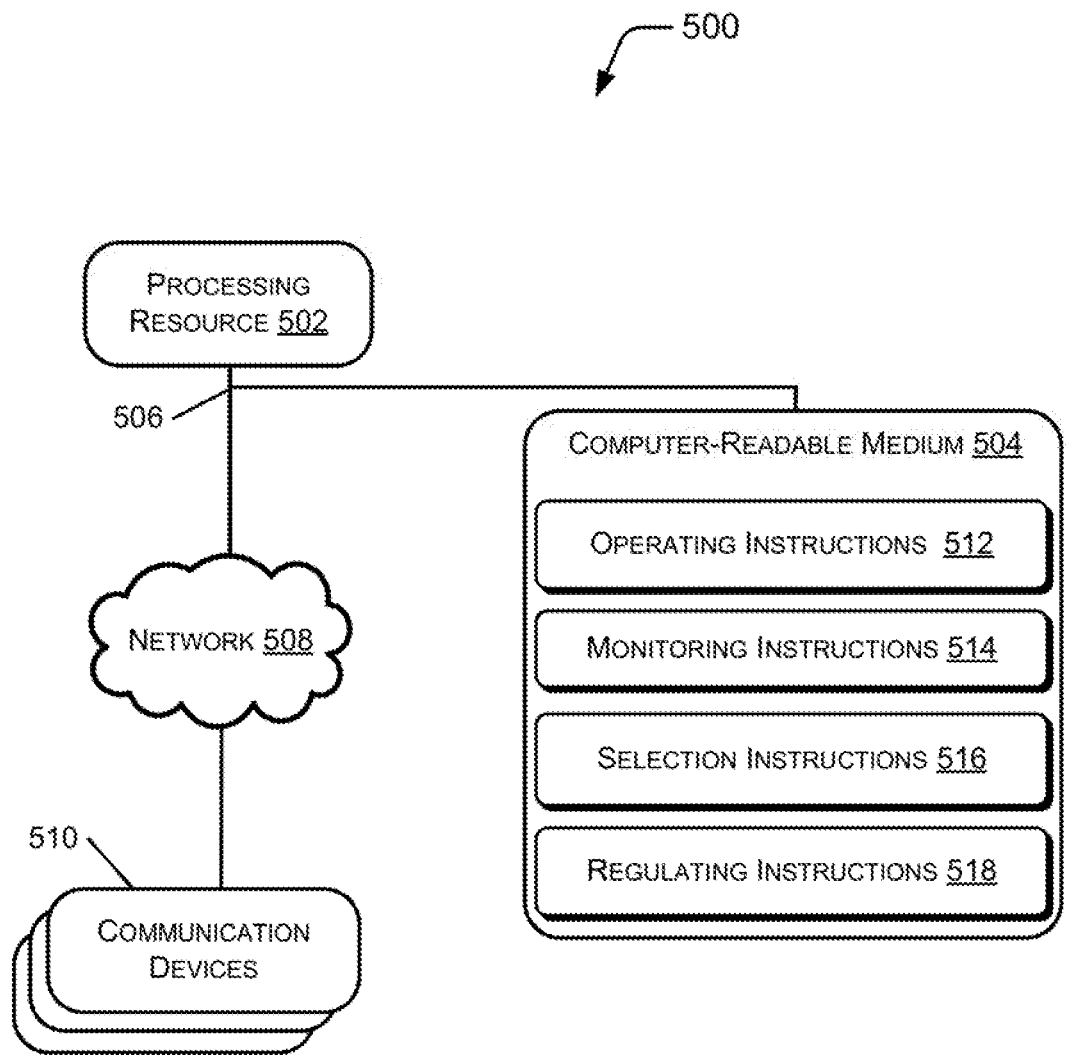
FIG. 5 illustrates a computing environment to dynamically regulate transmission power of antennas, according to an example.

FIG. 5 illustrates a computing environment to dynamically regulate transmission power of antennas of an electronic device, according to an example. The computing environment 500 may comprise at least a portion of a public networking environment or a private networking environment, or a combination thereof. In one example, the computing environment 500 includes a processing resource 502 communicatively coupled to a computer readable medium 504 through a communication link 506.

For example, the processing resource 502 may include a processor of an electronic device to process a machine-readable link. The computer readable medium 504 may be, for example, an internal memory device of the electronic device or an external memory device. In one example, the communication link 506 may be a direct communication link, such as any memory read/write interface. In another example, the communication link 506 may be an indirect communication link, such as a network interface. In such a case, the processing resource 502 may access the computer readable medium 504 through a network 508. The network 508 may be a single network or a combination of multiple networks and may use a variety of different communication protocols. The processing resource 502 and the computer readable medium 504 may also be coupled through the communication link 506, to communication devices 510 over the network 508.

Further, the computer readable medium 504 may include operating instructions 512, monitoring instructions 514, selection instructions 516, and regulating instructions 518. The computer-readable medium may include the operating instructions 512 to receive an indication of a simultaneous operation of a first antenna 102 and a second antenna 104, the simultaneous operation being indicative of simultaneous transmission and reception of signals by the first antenna 102 and the second antenna 104. In an example, the indication of the simultaneous operation may be received from a first driver of the first antenna 102 and a second driver of the second antenna 104. Further, the computer-readable medium may include the monitoring instructions 514 to detect a first signal parameter of the first antenna 102 and a second signal parameter of the second antenna 104, where the first signal parameter and the second signal parameter comprise an RSSI, an RSCP, or a combination thereof.

The computer-readable medium may further include the selection instructions 516 to select a combination matrix from a set of plurality of combination matrices of transmission powers based on the first signal parameter and the second signal parameter, where a particular combination matrix includes a combination of a first transmission power of the first antenna 102 and a second transmission power of the second antenna 104. In an example, a combination matrix of combination of transmission powers may be generated based on the first signal parameter, the second signal parameter, a threshold transmission value, where the threshold transmission value defines a maximum transmission power corresponding to an electronic device for adhering to the maximum permissible SAR value, in addition, the computer-readable medium may include the regulating instructions 518 to dynamically regulate, during the simultaneous operation, the first transmission power and the second transmission power based on the combination matrix.

Although examples of present subject matter have been described in language specific to structural features and/or methods, it is to be understood that the present subject matter is not necessarily limited to the specific features or methods described. Rather, the specific features and methods are disclosed and explained in the context of a few examples for the present subject matter.

We claim:

1. An electronic device comprising:
   a first antenna;
   a second antenna; and
   a power modulator to:
   determine a simultaneous operation of the first antenna and the second antenna;
   monitor a first signal parameter of the first antenna;
   monitor a second signal parameter of the second antenna, wherein the first signal parameter and the second signal parameter are indicative of a signal strength, a signal power, or a combination thereof;
   generate a set of combinations of transmission powers based on the first signal parameter and the second signal parameter; and
   dynamically regulate a first transmission power of the first antenna and a second transmission power of the second antenna by selecting a combination of transmission powers from the set for the first transmission power and the second transmission power based on a threshold transmission value.

2. The electronic device as claimed in claim 1, wherein the power modulator is to dynamically regulate the first transmission power and the second transmission power by adjusting the first transmission power and the second transmission power based on the selected combination of transmission powers.

3. The electronic device as claimed in claim 1, wherein the set includes a plurality of combination matrices, and wherein a particular combination matrix from among the plurality of combination matrices includes the combination of the first transmission power and the second transmission power.

4. The electronic device as claimed in claim 1, wherein the first signal parameter and the second signal parameter comprise a received signal strength indicator (RSSI), a received signal code power (RSCP), or a combination thereof.

5. The electronic device as claimed in claim 1, wherein the first antenna is a wireless wide area network (WWAN) antenna and the second antenna is a wireless local area network (WLAN) antenna.

6. The electronic device as claimed in claim 1, wherein the simultaneous operation is indicative of simultaneous transmission and reception of signals by the first antenna and the second antenna.

7. An electronic device comprising:
   a wireless wide area network (WWAN) antenna;
   a wireless local area network WLAN antenna;
   a power modulator to:
   determine a simultaneous operation of the WWAN antenna and the WLAN antenna;
   monitor a first signal parameter of the WWAN antenna and a second signal parameter of the WLAN antenna, wherein the first signal parameter and the second signal parameter are indicative of a signal strength, a signal power of an antenna, or a combination thereof;
   generate a set of combinations of transmission powers based on the first signal parameter and the second signal parameter;
   select, from the set of combinations of transmission powers, a combination of transmission powers for the WWAN antenna and the WLAN antenna based on the first signal parameter and the second signal parameter; and
   dynamically regulate a first transmission power of the WWAN antenna and a second transmission power of the WLAN antenna, during the simultaneous operation, using the selected combination of transmission powers for the WWAN antenna and the WLAN antenna.

8. The electronic device as claimed in claim 7, wherein the first signal parameter and the second signal parameter comprise a RSSI, a RSCP, or a combination thereof.

9. The electronic device as claimed in claim 7, wherein the set of combinations of transmission powers includes a plurality of combination matrices, and wherein a particular combination matrix from among the plurality of combination matrices includes the first transmission power for the WWAN antenna and the second transmission power for the WLAN antenna.

10. The electronic device as claimed in claim 9, wherein the plurality of combination matrices is stored in the electronic device.

11. The electronic device as claimed in claim 7, wherein the electronic device is to dynamically regulate a combined value of the first transmission power and the second transmission power to meet a threshold transmission value, during the simultaneous operation of the WWAN antenna and the WLAN antenna.

12. A non-transitory computer-readable medium comprising instructions executable by a processing resource of an electronic device to:
   receive an indication of a simultaneous operation of a first antenna and a second antenna, the simultaneous operation being indicative of simultaneous transmission and reception of signals by the first antenna and the second antenna;
   detect a first signal parameter of the first antenna and a second signal parameter of the second antenna, the first signal parameter and the second signal parameter comprising a received signal strength indicator (RSSI), a received signal code power (RSCP), or a combination thereof;
   generate a set of combinations of transmission powers based on the first signal parameter and the second signal parameter;
   select, based on the first signal parameter and the second signal parameter, a combination matrix from the set of plurality of combination matrices, wherein a particular combination matrix from among the plurality of combination matrices includes a combination of a first transmission power of the first antenna and a second transmission power of the second antenna; and dynamically regulate, during the simultaneous operation, the first transmission power and the second transmission power using the selected combination matrix.

13. The non-transitory computer-readable medium as claimed in claim 12, wherein the first antenna is a WWAN antenna and the second antenna is a WLAN antenna.

14. The non-transitory computer-readable medium as claimed in claim 12, wherein the indication of the simultaneous operation is received from a first driver of the first antenna and a second driver of the second antenna.

15. The non-transitory computer-readable medium as claimed in claim 12, wherein, during the simultaneous operation of the first antenna and the second antenna, a combined value of dynamically regulated first transmission power and the second transmission power meets a threshold transmission value.

\* \* \* \* \*